March 28, 1961 R. C. BAKER 2,976,718
GAGING APPARATUS FOR DIMENSIONS AND THE LIKE
Filed March 9, 1956
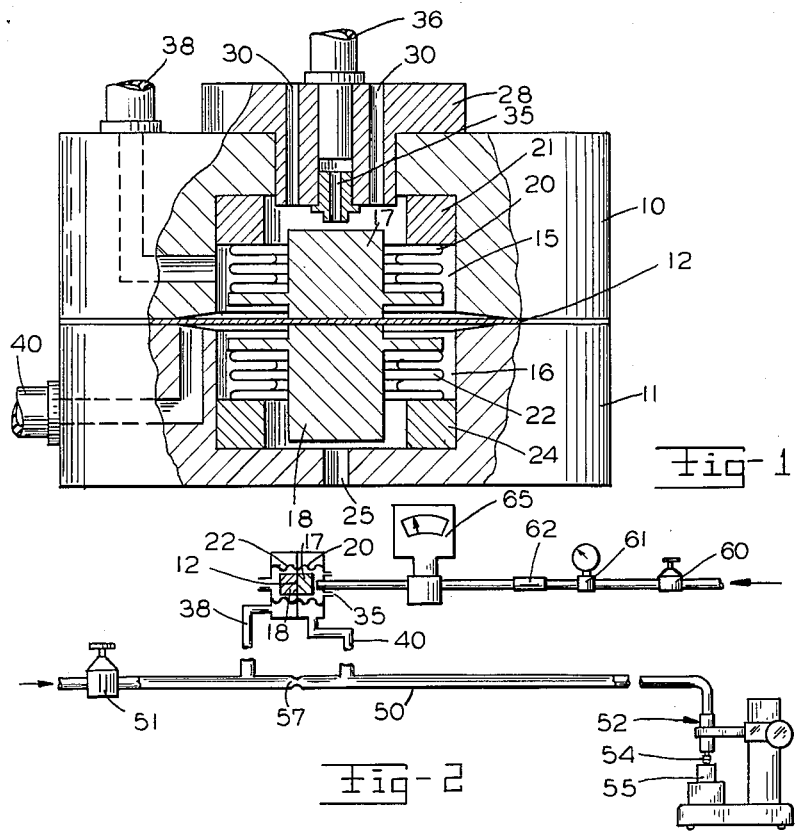
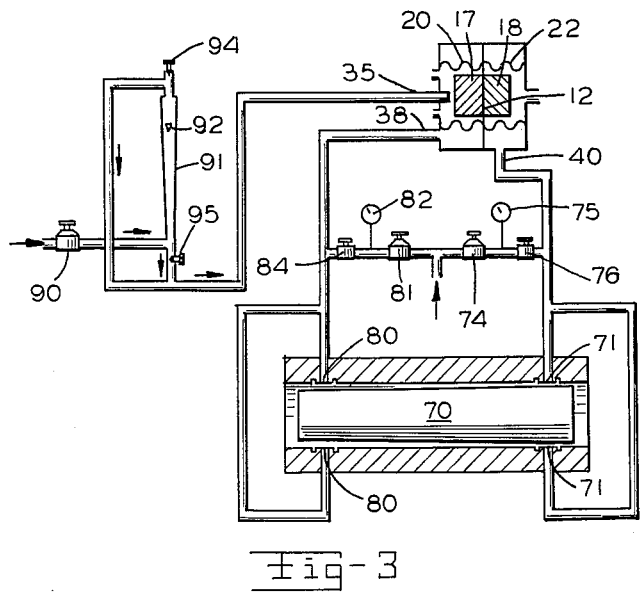
INVENTOR.
Ralph C Baker
BY Edward J. Noip
atty

United States Patent Office 2,976,718
Patented Mar. 28, 1961

2,976,718

GAGING APPARATUS FOR DIMENSIONS AND THE LIKE

Ralph C. Baker, Dayton, Ohio, assignor, by mesne assignments, to The Sheffield Corporation, a corporation of Delaware Filed Mar. 9, 1956, Ser. No. 570,454

8 Claims. (Cl. 73—37.5)

This invention relates to gaging systems and more particularly to air type gaging systems responsive to physical characteristics of gaged products or movements of machine components.

It is an object of this invention to provide an air leakage gaging system for obtaining a single flow condition in response to the difference between pressures relatively variable in accordance with a physical characteristic of a product gaged or the movement of a machine component.

It is a further object to provide such a system for obtaining highly amplified flow changes in a gaging passage means in response to differential pressure variations in an independent air gaging circuit controlled by a gaging head whereby flows in the gaging passage means are almost instantaneously responsive in an amplified sense regardless of displacement from the gaging head.

It is a further object to provide an apparatus for use in such systems wherein differential pressures obtained in response to a physical characteristic or component movement are applied to opposite sides of a movable member controlling the leakage from an independent passage means having gaging means responsive to such leakage.

It is a further object to provide such an apparatus wherein a movable member such as a diaphragm or the like has closed chamber means at each side thereof for placement in communication with relatively variable gaging pressures whereby the member moves in response to the differential in the applied pressures and the flow through an air leakage orifice exhausting to atmosphere and adapted for connection to a gaging passage means is controlled by movements of the member.

Other objects and advantages of the invention will be apparent from the following description, the appended claims, and the accompanying drawing, in which Figure 1 is a view partially broken away to central section, of an apparatus for controlling flow in response to a pressure differential and embodying the present invention, Figure 2 illustrates a gaging system wherein substantially instantaneously responsive pressure differences are applied to obtain highly amplified flow changes in an independent gaging passage means, and Figure 3 is a system wherein the differential in pressures between two gaging circuits is applied to control of flow from an independent circuit, thus providing a single gaging response.

The apparatus of the present invention is provided for controlling flow in a gaging system in response to the difference between pressures obtained at two points in the system in response to a gaged product characteristic, a component movement, or similar conditions. The relatively variable pressures are applied to opposite sides of a pressure responsive movable member which controls the flow from a gaging passage means to vary the flow conditions in accordance with the differential pressure applied to the movable member. In the illustrated applications the movable member is a diaphragm and it controls the flow from an open orifice at the terminal end of a gaging passage means.

Figure 1 illustrates in partial central section an apparatus embodying the present invention and including housing sections 10 and 11 in sealed engagement with the periphery of a diaphragm 12. Sections 10 and 11 provide chambers 15 and 16 at opposite sides of diaphragm 12. Stop members 17 and 18 are fixed to the central portion of diaphragm 12 for movement therewith.

A bellows 20 is sealably connected between member 17 and a ring 21 seated against the wall of chamber 15. Similarly a bellows 22 is connected between member 18 and ring 24 seated in the wall of chamber 16.

The interior of bellows 22 is in communication with atmosphere through an opening 25 in the wall of housing section 11. An insert 28 in housing section 10 provides openings 30 placing the interior of bellows 20 in communication with atmosphere and supports a fluid leakage orifice 35 in opposition to the end of stop member 17.

Orifice 35 is placed in communication with a suitable gaging passage means through a conduit 36, and chambers 15 and 16 are respectively connected to points in the system through conduits 38 and 40. Chambers 15 and 16 are limited in volume for rapid response to pressure changes. Stop members 17 and 18 cooperate with the inner end of orifice 35 and the inner surface of housing section 11 respectively, to limit deflections of diaphragm 12 and prevent its straining or rupture under extreme pressure differentials.

Figure 2 illustrates diagrammatically a first gaging system in which the apparatus of Fig. 1 is utilized as an amplifying unit. Passage means 50 has a pressure regulator 51 at one end thereof for connection to a suitable pressure source. In the exemplary application illustrated the other end of passage means 50 is connected to a fluid leakage gaging cartridge 52 although other forms of tooling can be used. Such cartridges includes a leakage orifice controlled by movements of a slidable work contactor 54 shown in engagement with a gage block 55 for measuring the height thereof.

A restriction 57 in passage means 50 is of such size as to offer only slight resistance to flow. It can include a cylindrical passage of about .06 inch in length and slightly less than .05 inch diameter, for example. Thus speed of response is maintained while a small pressure difference is obtained across restriction 57 for application to the diaphragm.

Changes in flow will be responsive to movements of work contactor 54 within cartridge 52 in a substantially instantaneous manner. Conduit 38 of the differential unit is connected at the upstream side of restriction 57 and conduit 40 to the downstream side of this same restriction. Pressures on opposite sides of restriction 57 are applied to opposite faces of diaphragm 12 and the diaphragm flexes in accordance with the differential between the applied pressures and the flow through passage means 50.

As independent gaging circuit has passage means extending between a pressure regulator 60 connected to a source of fluid pressure and orifice 35 controlled by the flexing of diaphragm 12. This circuit includes a pressure indicator 61, a flow restriction 62, and a pressure responsive indicating instrument of a conventional type indicated at 65 which is continuously responsive to provide an infinitely variable gaging signal within the effective range of flexing of diaphragm 12. In this illustrated application restriction 62 is of such size as to provide a back-pressure chamber between orifice 35 and restriction 62 in which pressure changes will vary in accordance with the flow through the orifice. Instrument 65 will respond to these pressures. Other gaging means such as pressure responsive switch units, for example, can also be used.

Conduit 38, being connected to the upstream side of restriction 57 subjects the left-hand side of diaphragm 12 as viewed in Figure 2 to regulated pressure. The pressure downstream of restriction 57 will vary with the leakage through cartridge 52, causing a differential pressure across diaphragm 12 which controls the flow through orifice 35.

Because diaphragm 12 is effectively subjected only to the difference between two pressures within the gaging system an extremely thin diaphragm can be provided which will flex rapidly and to a greater extent to pressure differences thereacross. High amplifications can thus be obtained. Also because wide pressure differences are avoided the diaphragm operates in its lower range of flexing where it is more linearly responsive to pressure differences than in its extreme flexing range. The system of Figure 2 provides almost immediate response of diaphragm 12 to changes in flow through passage means 50 and gives an amplified control of the flow issuing through orifice 35 in response to flow through the tooling.

The linear range of response of diaphragm 12 can be easily varied within a wide range by adjusting pressure regulator 51. An increase in pressure increases the linear range. Because of this available adjustment, variations in manufactured clearance conditions between diaphragm 12 and orifice 35 and in the tooling at the end of passage means 50 can be readily compensated for and are not critical, making possible more economical manufacture of system components.

In Figure 3 the differential unit is utilized in a system to control a flow gaging circuit in response to the differential between pressures existing in a pair of independent back-pressure circuits. This exemplary application is provided for obtaining a single indication of the taper of a workpiece 70. The flow through opposed orifices 71 is controlled by the diameter at one end of workpiece 70. Orifices 71 are at the terminal end of gaging passage means including a pressure regulator 74, a pressure indicator 75 and an adjustable restriction 76. Pressure variations in the passage beyond restriction 76 are applied through conduit 40 to one side of diaphragm 12. A similar back-pressure circuit having orifices 80 controlled by the diameter at the other end of workpiece 70 includes a pressure regulator 81, an indicator 82 and an adjustable restriction 84. Regulators 74 and 81 are connected to sources of fluid pressure, not shown. Variations in pressure in this passage responsive to the diameter of workpiece 70 are applied through conduit 38 to the other side of diaphragm 12. Thus diaphragm 12 flexes in response to the difference in the diameters at the respective ends of workpiece 70. The system includes a gaging circuit responsive to movements of diaphragm 12. The gaging circuit comprises a regulator 90, an internally tapered transparent flow tube 91 having an indicating float 92, and orifice 35, all in series communication. An adjustment 94 controls the flow of air to atmosphere after its passage upward through tube 91 to adjust the float position, and a by-pass adjustment at 95 varies the amplification in a known manner.

Float 92, responsive to the flow through orifice 35, will indicate the difference in diameters at the respective ends of workpiece 70 or the taper of the workpiece.

Thus it is seen that an apparatus of simple construction has been provided for controlling flow in a gaging system in response to differential pressures obtained in response to a physical characteristic of a product, a component movement, or the like. High amplification responses can be obtained almost instantaneously and differential conditions can be indicated on a single instrument or applied to a single gaging means.

While the form of apparatus herein described constitutes a preferred embodiment of the invention, it is to be understood that the invention is not limited to the precise form illustrated, and that changes may be made therein without departing from the scope of the invention defined in the appended claims.

What is claimed is:

1. Dimensional gaging apparatus comprising a fluid circuit including in sequence regulator, restriction and outlet orifice means for obtaining fluid pressures at two points which relatively vary in accordance with a dimensional characteristic of a part in association with said orifice means, a flexible diaphragm, housing means in sealed engagement with peripheral edges of the diaphragm and providing closed chambers at each side thereof, an expansible bellows at each side of the diaphragm, each of said bellows being sealably connected between the respective housing chamber wall and the adjacent surface of the diaphragm to provide sealed expansion chambers at each side of the diaphragm exterior of the bellows, the interior of each bellows providing a space in communication with atmosphere, conduit means in closed communication between each of said expansion chambers and a respective one of said two points in said fluid circuit for applying the pressures at said two points to respective sides of said diaphragm, and gaging means supported in said housing means at one side of said diaphragm within the space provided by the respective bellows and controlled by the diaphragm to provide gaging signals varying with diaphragm movement.

2. Dimensional gaging comprising a fluid circuit including in sequence regulator, restriction and outlet orifice means for obtaining fluid pressures at two points which relatively vary in accordance with a dimensional characteristic of a part in association with said orifice means, a gaging unit including a housing, flexible interior wall means in said housing providing first and second expansible chambers, connection means for each of said chambers in communication with said fluid circuit at a respective one of said two points therein, a movable member in said housing operatively connected to said flexible wall means positioned solely in response to the difference between the two pressures obtained in the expansible chambers and at the two points in the fluid circuit, a gaging member carried by said housing in controlled relation to said movable member, and a gaging system connected to said gaging member including means providing infinitely variable gaging signals continuously responsive to movement of said movable member within its effective range of movement as determined solely by the change in relationship between the pressures at said two points in said fluid circuit.

3. Dimensional gaging comprising a first fluid circuit including in sequence regulator, restriction and outlet orifice means for obtaining fluid pressures at two points which relatively vary in accordance with a dimensional characteristic of a part in association with said orifice means, a gaging unit including a housing, flexible interior wall means in said housing providing first and second expansible chambers, connection means for said unit in communication with said chambers connecting each chamber to a respective one of said two points in said first circuit, a movable member in said housing operatively connected to said flexible wall means positioned solely in response to the difference between the two pressures obtained in the expansible chambers, means providing a second fluid circuit comprising in sequence a regulator, restriction and an outlet member in said housing controlled by said movable member, said second fluid circuit including flow responsive signal means downstream of said restriction providing infinitely variable gaging signals continuously responsive to movement of said movable member within its effective range of movement as determined solely by the change in relationship between the pressures at said two points in said first circuit.

4. An apparatus as set forth in claim 2 wherein said signal providing means includes an indicator providing a single indication indicative of the relationship between the pressure at said two points in said first circuit.

5. An apparatus for obtaining a gaging signal variable in accordance with the relationship between pressures at two points in an air leakage type gaging system comprising, a pressure regulator adapted for connection to a source of fluid under pressure, a gaging head for obtaining fluid flow in accordance with product dimensions and the like, means providing a flow path between said regulator and said gaging head, restriction means in said flow path, a housing, flexible wall means in said housing providing first and second oppositely acting expansible chambers, passage means connected between the flow path downstream of said restriction means and the first of said chambers to provide a gaging pressure therein varying with the gaged characteristic, passage means connected between the flow path upstream of said restriction means and the second of said chambers to provide a substantially constant pressure in opposition to the gaging pressure, a movable member in said housing positioned in response to the relationship between the chamber pressures, and gaging means controlled by movement of said movable member to provide a gaging signal in accordance therewith.

6. An apparatus as set forth in claim 5 wherein said gaging means includes a separate fluid leakage gaging circuit including in sequence a regulator, restriction and outlet flow control means exhausting directly to atmosphere controlled by and cooperating with said movable member, and indicating means connected downstream of said restriction responsive to flow through the circuit.

7. Apparatus for obtaining a gaging signal determined by the relationship between dimensions of workpieces and the like, comprising workpiece support means including first and second controllable orifice gaging means in gaging relation with different workpiece portions and controlled thereby, a fluid leakage gaging circuit connected to each of said gaging means, each of said fluid leakage gaging circuits including means providing a pneumatic pressure gaging signal varying with the dimension of the respective workpiece portion, and comparing means connected to both said gaging circuits including a movable wall portion subjected on opposite sides to the gaging pressures obtained in the respective gaging circuits and positioned in accordance with the relationship therebetween, and a further pneumatic gaging circuit controlled in accordance with the position of said movable wall portion for automatically comparing the gaging signals and providing a single signal determined by the relationship between the gaging signals and the relationship between the gaged workpiece portions.

8. An apparatus as set forth in claim 7 wherein said comparing means includes a calibrated indicator having a movable indicating member positioned in accordance with the gaged relationship between the different workpiece portions.

References Cited in the file of this patent

UNITED STATES PATENTS

| | | |
|---|---|---|
| 2,166,705 | Hochschulz | July 18, 1939 |
| 2,520,468 | Moore | Aug. 29, 1950 |
| 2,520,547 | Hughes | Aug. 29, 1950 |
| 2,573,843 | Hendrix et al. | Nov. 6, 1951 |
| 2,651,317 | Heinz | Sept. 8, 1953 |
| 2,669,246 | Segerstad | Feb. 16, 1954 |
| 2,706,397 | Byrkett | Apr. 19, 1955 |
| 2,805,568 | Baker | Sept. 10, 1957 |